(No Model.) 2 Sheets—Sheet 2.
W. P. HAYNE.
MANUFACTURE OF BARRELS.
No. 509,534. Patented Nov. 28, 1893.
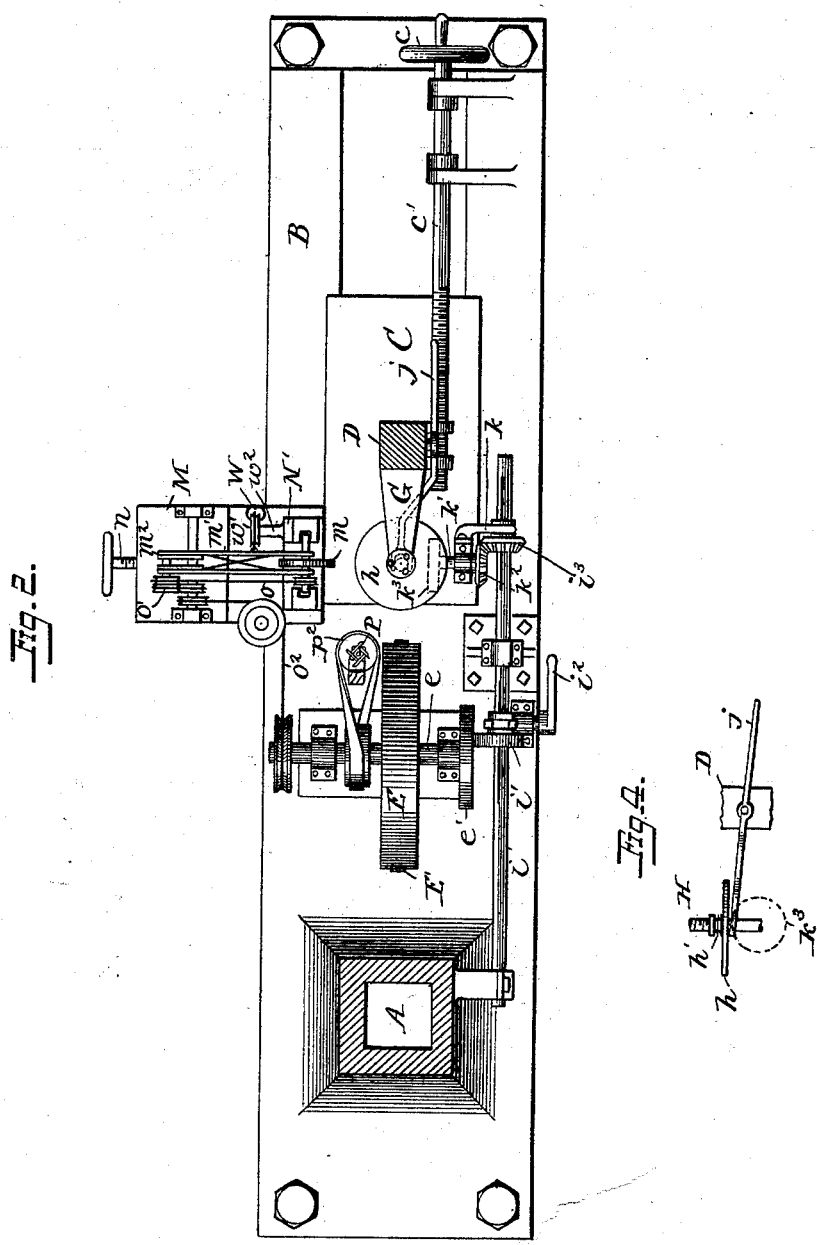
WITNESSES
INVENTOR
William P. Hayne.
By Foster & Freeman
Attorneys.

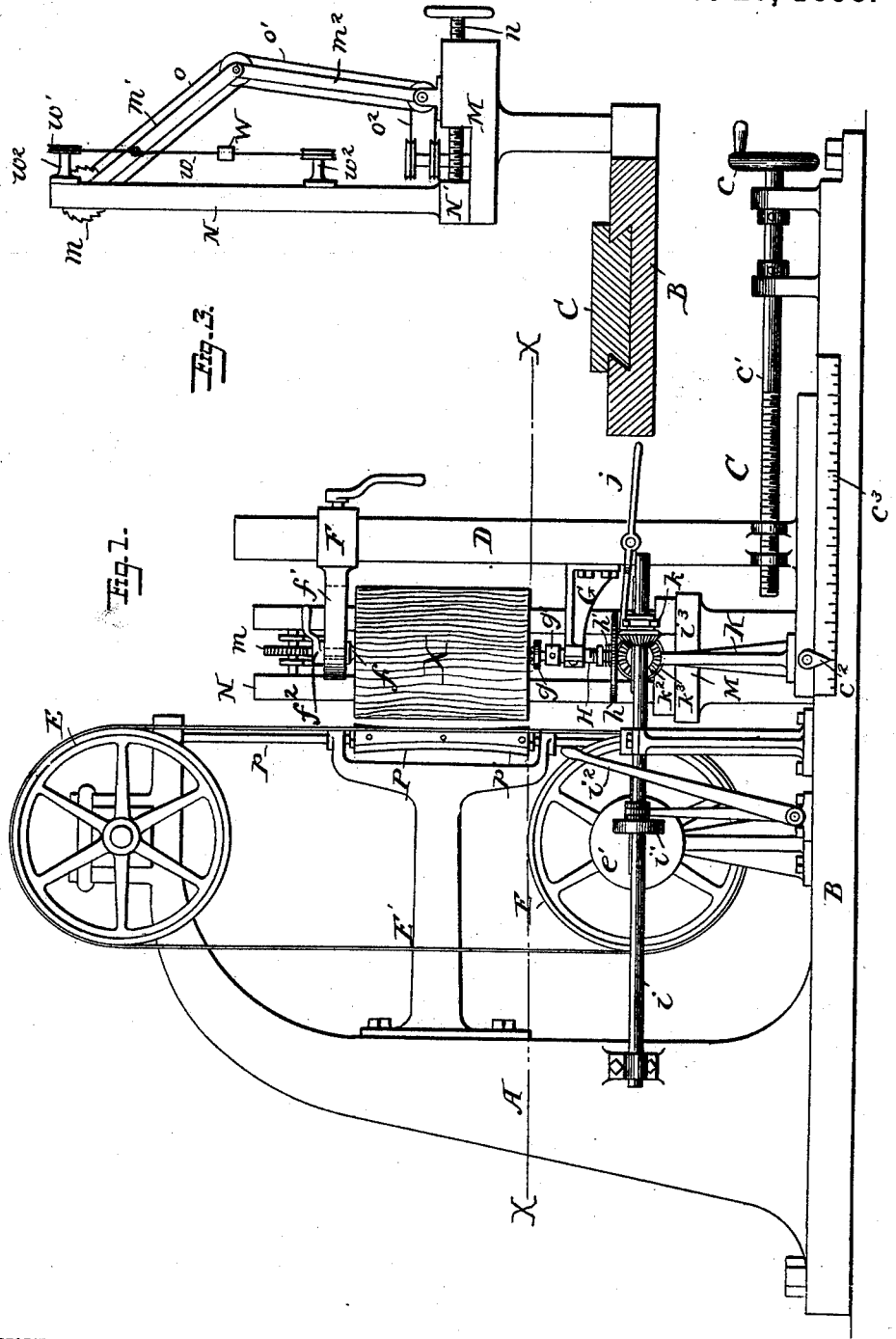

UNITED STATES PATENT OFFICE.

WILLIAM PHILIP HAYNE, OF COUSHATTA, LOUISIANA.

MANUFACTURE OF BARRELS.

SPECIFICATION forming part of Letters Patent No. 509,534, dated November 28, 1893.

Application filed July 20, 1891. Serial No. 400,106. (No model.)

*To all whom it may concern:*

Be it known that I, WILLIAM PHILIP HAYNE, a citizen of the United States, residing at Coushatta, Red River parish, State of Louisiana, have invented certain new and useful Improvements in the Manufacture of Barrels, of which the following is a specification.

My invention relates to an improved method of and machine for manufacturing barrels, tubs and like articles, and it consists in various novel combinations and features of construction which I will describe hereinafter, reference being had to the accompanying drawings, in which—

Figure 1, is a side elevation. Fig. 2, is a sectional view looking downward from the line $x$—$x$, Fig. 1, the grooving device being shown in plan. Fig. 3, is a side elevation of the grooving device the machine bed being shown in section. Fig. 4, is an elevation of a part of Fig. 1, showing the friction wheels separated.

In manufacturing barrels according to my invention a cylindrical block or section of log is mounted upon centers and first turned or sawed into a true cylinder. A groove is then made in its periphery, a saw inserted in the groove and a cylindrical stave cut from the block. Before or after the stave is separated from the block, but preferably before, the outer surface of the stave is rounded off to form the bulge of the barrel by a revolving cutter. The stave is then removed and its inner surface is afterward concaved and grooved by other machinery.

The machine for separating the staves from the block may also be adapted to cut tapered staves from which to make tubs or buckets. From each block a series of barrels, buckets or tubs of different sizes may be cut, by separating concentric layers of wood of different diameters in the manner before pointed out.

The invention consists broadly in the combination of mechanism for grooving the blocks, a saw for cutting the stave from the block, and a cutter for forming the bulge upon the outer surface when a barrel is to be made.

It consists further in various details of construction and arrangement.

The form of machine which I prefer in carrying out my invention is illustrated in the accompanying drawings and will be described in detail.

The main frame of the machine consists of an arm A, and a base B. Adjustably mounted upon the base is a sliding frame C, carrying a standard D, the said sliding frame C, being dove-tailed into the base as shown and a screw $c'$ having a hand wheel $c$ is used to adjust it relatively to the base B, the exact position of the frame C, on the base B, at any time being indicated by a pointer $c^2$, and scale $c^3$.

Upon the arm A, and base B, are mounted two pulleys E, carrying a band saw E', which is driven from any suitable surce of power.

Upon the frame C, are mounted fixed and sliding arms G, and F, between which the block to be operated upon is mounted vertically upon centers $g, f$, the former being the driving center.

In order that the block may be adjusted at an angle to the saw, so as to cut tapered staves, suitable for making tubs and buckets the upper center $f$, is adjustable lengthwise of the arm F, in a slot $f'$, and a screw clamp $f^2$, is provided for holding it in any position in the slot. The lower center, which is upon the upper end of a shaft H, is preferably connected to the shaft by a ball and socket or other universal joint $g'$, so as to accommodate itself to the inclination of the block. The shaft H, which rotates the block may be driven from any other movable portion of the machine by suitable connections but I prefer the form of friction gearing shown in the drawings. The lower band saw pulley E, is mounted on a shaft $e$, in suitable bearings upon the base B. At one end of the shaft $e$, is a friction disk $e'$, against which bears the edge of a friction wheel $i'$ carried by a shaft $i$, which runs at right angles to the shaft $e$. The friction wheel $i'$, is connected to the shaft $i$, by means of a feather and it is movable by means of a hand lever $i^2$, across the face of the disk $e'$, to vary the speed of the shaft $i$, or stop the same. Upon the other end of the shaft $i$, is a bevel wheel $i^3$, which is free to slide upon the shaft, but connected to turn therewith by means of a feather. This bevel gear is held in place by a yoke $k$, upon a standard K, which is fixed to the sliding frame C. In the standard K, is journaled a shaft $k'$, carrying a bevel wheel $k^2$, which intermeshes with the wheel $i^3$. Upon the inner end of the shaft $k'$ is mounted a friction wheel $k^3$, upon which bears the friction disk $h$, which is splined upon the shaft H, and constantly pressed upon the friction wheel by means of a spiral spring $h'$. The block X is thus rotated at any speed desired. In order to stop the rotation of the block at once should it be desired to do so a hand lever $j$, is pivoted to the standard D, and arranged to raise the disk $h$, from the friction wheel $k^3$, against the pressure of the spring $h'$.

To form the longitudinal groove in the periphery of the block preparatory to inserting the saw, I arrange a rotating cutter so that it may be adjusted radially to the block, in order to groove blocks of different diameters, and also provide means for moving it freely lengthwise of the block.

As shown a cutter $m$, is mounted upon the end of an arm $m'$ which in turn is jointed to an arm or link $m^2$, supported upon a base M. Guide posts N, are also mounted upon the base M, and provided with suitable ways or grooves in which the journals of the cutter run to guide the cutter in a vertical path. The posts N, are supported upon a sliding base N', which is dove-tailed or otherwise fitted to be propelled backward or forward upon the base M, by means of a fitted screw $n$. The cutter $m$, and its supporting arms are sustained by means of a rope $w$, and counter weight W, which rope passes around pulleys $w'$, supported upon arms $w^3$, which extend outward from guide posts N, the cutter $m$, is rotated rapidly by means of suitable belting such as the bands $o$, $o'$, and $o^2$, passing around pulleys at the joints of the arms $m'$, $m^2$, and communicating with the power shaft, as shown in Figs. 1 and 3. The outer surface of the block is rounded off to form the bulge of the barrel previous to sawing the stave by means of a cutter head P, arranged upon a vertical shaft $p$, and provided with concaved cutting blades $p'$. The shaft $p$, is mounted in bearings on the main frame and rapidly revolved by means of a band communicating power from the shaft $e$, and passing round a pulley $p^2$.

The operation of the machine so far as described is as follows: The block X, which may be a section of log untrimmed, is mounted on the centers of the movable frame, C. The machine is then started, the shaft H, being disconnected so as to remain stationary by means of the lever $j$, or by shifting the friction wheel $i'$, to the center of the disk $e'$. The grooving cutter is then adjusted and a groove cut in the outside of the log after which the block is revolved and the frame C, is moved forward until the saw is in the groove. The block X, is then caused to turn slowly by means of the friction gearing, which results in shaping the bulge of the barrel by means of the cutter P, and separating the cylindrical stave by means of the saw during a single revolution of the block, the cutter being so situated relatively to the saw that the operations of forming the bulge and sawing off the stave take place simultaneously. The stave or barrel body thus formed is removed and the operation repeated as often as desired, each succeeding barrel body being smaller than the preceding one. When it is desired to cut tapered staves for tubs or buckets, the upper center is adjusted out of line with the lower center, thus inclining the axis of the block to the saw, the cutter P, being removed, the operation is otherwise the same as in cutting barrel bodies.

It is not necessary that a separate groove be cut in the block for each barrel body, inasmuch as the cutter may be made of sufficient diameter to cut a groove equal in depth to several barrel staves or to the entire number which may be cut from a single block.

Without limiting myself to the precise construction and arrangement of parts, I claim—

1. The combination in a barrel making machine with the main frame, of a sliding frame thereon provided with centers for holding a block, mechanism for grooving the block longitudinally and a saw for separating a cylindrical stave from the block all arranged upon the main frame, said grooving mechanism and saw being arranged to operate successively upon the block while it is mounted in the centers, substantially as described.

2. The combination in a barrel making machine of a saw, a grooving cutter, and a rotary bulge cutter supported upon a main frame, and a sliding frame having centers for supporting a block and arranged to feed the block to the bulge cutter and saw, substantially as described.

3. The combination in a barrel making machine of a band saw having the driving shaft $e$, sliding frame C, having the centers $f$, $g$, and the shaft H, friction gearing connecting the shaft $e$, with the shaft H, and means for disconnecting said gearing to stop the shaft H, substantially as described.

4. The combination in a barrel making machine with the main frame of a sliding frame thereon having centers for supporting a block, mechanism for grooving the block longitudinally, a band saw for separating a cylindrical stave from the block, and a cutter for shaping the bulge of the stave, said band saw and cutter being arranged to operate simultaneously upon the stave, substantially as described.

5. The combination with a main shaft carrying a band saw drive wheel and a friction disk, of a band saw, a rotary bulge-cutter adjacent to the saw, a grooving-cutter and a driving center adapted to turn a block, said center being driven from the friction disk by suitable connections, substantially as described.

In testimony whereof I have signed my name to this specification in the presence of two subscribing witnesses.

WILLIAM PHILIP HAYNE.

Witnesses:
A. F. JONES,
P. A. WILLIAMS.